(12) United States Patent
Sharma et al.

(10) Patent No.: US 12,400,495 B2
(45) Date of Patent: Aug. 26, 2025

(54) METHOD OF PROVIDING INFORMATION RELATED TO STATUS OF ELECTRIC VEHICLE

(71) Applicant: GM Global Technology Operations LLC, Detroit, MI (US)

(72) Inventors: Manoj Kumar Sharma, Troy, MI (US); Donald K. Grimm, Utica, MI (US); Michael Alan Losh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 18/448,524

(22) Filed: Aug. 11, 2023

(65) Prior Publication Data

US 2025/0054345 A1    Feb. 13, 2025

(51) Int. Cl.
| | |
|---|---|
| *G07C 5/08* | (2006.01) |
| *B60L 53/68* | (2019.01) |
| *B60Q 1/50* | (2006.01) |
| *G07C 5/00* | (2006.01) |
| *H02J 7/00* | (2006.01) |

(52) U.S. Cl.
CPC ............ *G07C 5/0825* (2013.01); *B60L 53/68* (2019.02); *B60Q 1/5035* (2022.05); *B60Q 1/543* (2022.05); *G07C 5/008* (2013.01); *G07C 5/0808* (2013.01); *H02J 7/00032* (2020.01); *H02J 7/0048* (2020.01)

(58) Field of Classification Search
CPC .... G07C 5/0825; G07C 5/008; G07C 5/0808; B60L 53/68; B60Q 1/5035; B60Q 1/543; H02J 7/00032; H02J 7/0048
See application file for complete search history.

(56) References Cited

U.S. PATENT DOCUMENTS

| | | |
|---|---|---|
| 5,757,595 A | 5/1998 | Ozawa et al. |
| 8,063,757 B2 | 11/2011 | Frey et al. |
| 9,818,268 B2 | 11/2017 | Muntada Roura |
| 10,513,197 B1 | 12/2019 | Carpenter et al. |
| 10,946,760 B2 | 3/2021 | Miftakhov |
| 11,580,798 B2 | 2/2023 | Weber et al. |
| 11,718,189 B2 | 8/2023 | Coburn et al. |
| 2009/0082957 A1* | 3/2009 | Agassi ............... B60L 53/65 701/532 |
| 2010/0094496 A1* | 4/2010 | Hershkovitz .......... B60L 50/66 701/22 |
| 2011/0043355 A1 | 2/2011 | Chander et al. |
| 2012/0025765 A1 | 2/2012 | Frey et al. |
| 2012/0242466 A1 | 9/2012 | Stillfried et al. |

(Continued)

FOREIGN PATENT DOCUMENTS

| | | |
|---|---|---|
| DE | 102013226188 A1 | 7/2014 |
| DE | 102014222695 A1 | 10/2015 |
| DE | 102018220429 A1 | 5/2020 |

*Primary Examiner* — Rufus C Point
(74) *Attorney, Agent, or Firm* — Vivacqua Crane, PLLC (57) ABSTRACT

A system for providing information related to a charge status of an electric vehicle when the electric vehicle is connected to a charging station includes a system controller in communication with an electrical system within the electric vehicle and adapted to monitor information related to a charge status of the electric vehicle, and provide notification, to a third-party, of the charge status of the electric vehicle.

18 Claims, 6 Drawing Sheets

(56) References Cited

U.S. PATENT DOCUMENTS

| | | | |
|---|---|---|---|
| 2012/0309455 A1* | 12/2012 | Klose | B60L 53/68 |
| | | | 455/557 |
| 2014/0253306 A1 | 9/2014 | Gillespey | |
| 2015/0202975 A1* | 7/2015 | Solomon | G06Q 10/06316 |
| | | | 705/7.26 |
| 2015/0314697 A1 | 11/2015 | Chen et al. | |
| 2016/0068076 A1 | 3/2016 | Seo et al. | |
| 2016/0363991 A1* | 12/2016 | Schlecht | G09F 27/005 |
| 2018/0065544 A1 | 3/2018 | Brusco | |
| 2019/0217715 A1* | 7/2019 | Christen | B60L 53/31 |
| 2019/0232795 A1 | 8/2019 | Zendler et al. | |
| 2020/0006969 A1* | 1/2020 | Penilla | H04L 67/04 |
| 2020/0101858 A1 | 4/2020 | Kuroda et al. | |

* cited by examiner

METHOD OF PROVIDING INFORMATION RELATED TO STATUS OF ELECTRIC VEHICLE

The present disclosure relates to systems and methods for providing information related to a charge status of an electric vehicle.

With increasing number of electric vehicles and the expanded use of electric vehicle, it is important that a driver of an electric vehicle can identify and evaluate potential charging stations. Currently, a driver must guess when deciding where to stop at a charging station location, or when selecting a specific charging station at which to queue. A system that provides notification to a third party of the charging status of an electric vehicle would allow a third party to strategically pick charging station locations and specific charging stations.

Thus, while current systems and methods achieve their intended purpose, there is a need for a new and improved system and method for providing information related to a charge status of an electric vehicle when the electric vehicle is connected to a charging station, whereby a third party can strategically select a charging station that minimizes the time spent waiting for such charging station.

SUMMARY

According to several aspects of the present disclosure a method of providing information related to a charge status of an electric vehicle when the electric vehicle is connected to a charging station, includes monitoring, with a system controller in communication with an electrical system within the electric vehicle, information related to a charge status of the electric vehicle, and providing notification, to a third-party, with the system controller, the charge status of the electric vehicle.

According to another aspect, the monitoring, with the system controller in communication with the electrical system within the electric vehicle, information related to a charge status of the electric vehicle further includes monitoring, with the system controller, at least one of: a level of charge of the electrical system within the electric vehicle, and a time left until the charging of the electric vehicle is complete.

According to another aspect, the monitoring, with the system controller, a time left until the charging of the electric vehicle is complete further includes calculating a time until one of: when the electric vehicle is fully charged, and when the electric vehicle is charged sufficiently to allow the electric vehicle to travel from the charging station to a planned destination.

According to another aspect, the providing notification, to a third-party, with the system controller, the charge status of the electric vehicle further includes: receiving, with the system controller of the electric vehicle, a charging status query from a third-party, wherein the third party initiates the charging status query based on at least one of: in response to manual initiation by the third party, automatically based on third party navigation and destination information, and automatically based on battery charge level of the third party and proximity to the charging station, and providing notification, to the third-party, with the system controller, the charge status of the electric vehicle in response to receiving the charging status query.

According to another aspect, the providing notification, to a third party, with the system controller, the charge status of the electric vehicle further includes providing a visual representation of the current level of charge of the electric vehicle and the time left until the charging of the electric vehicle is complete, and receiving, by the third party, the visual representation of the current level of charge of the electric vehicle and the time left until the charging of the electric vehicle is complete.

According to another aspect, the providing a visual representation of the current level of charge of the electric vehicle and the time left until the charging of the electric vehicle is complete further includes, displaying, with an internal/external display system in communication with the system controller and adapted to project information onto a window surface of the vehicle, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, the providing a visual representation of the current level of charge of the electric vehicle and the time left until the charging of the electric vehicle is complete further includes displaying, with the system controller, via a display of the electric vehicle, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, the providing a visual representation of the current level of charge of the electric vehicle and the time left until the charging of the electric vehicle is complete further includes displaying, with the system controller, via a display screen of the charging station, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, the providing notification, to a third party, with the system controller, the charge status of the electric vehicle further includes: uploading, with the system controller, the current level of charge of the electric vehicle and the time left until the charging of the electric vehicle is complete to a cloud-based charging station network, accessing, by the third party, the cloud-based charging station network, and receiving, by the third party, from the cloud-based charging station network, the current level of charge of the electric vehicle and the time left until the charging of the electric vehicle is complete.

According to another aspect, the providing notification, to a third party, with the system controller, the charge status of the electric vehicle further includes sending, with the system controller, notification to the third party that the charging station to which the electric vehicle is connected has malfunctioned.

According to several aspects of the present disclosure, a system for providing information related to a charge status of an electric vehicle when the electric vehicle is connected to a charging station includes a system controller in communication with an electrical system within the electric vehicle and adapted to: monitor information related to a charge status of the electric vehicle, and provide notification, to a third-party, of the charge status of the electric vehicle.

According to another aspect, when monitoring information related to a charge status of the electric vehicle, the system controller is further adapted to monitor a level of charge of the electrical system within the electric vehicle, and a time left until the charging of the electric vehicle is complete.

According to another aspect, when monitoring a time left until the charging of the electric vehicle is complete the system controller is further adapted to calculate at least one of: a time until the electric vehicle is fully charged, and a time until the vehicle is charged sufficiently to allow the electric vehicle to travel from the charging station to a planned destination.

According to another aspect, when providing notification, to a third-party, the charge status of the electric vehicle, the system controller is further adapted to: receive a charging status query from a third-party, wherein the third party initiates the charging status query based on at least one of: in response to manual initiation by the third party, automatically, based on third party navigation and destination information, and automatically, based on battery charge level of the third party and proximity to the charging station, and provide notification, to the third-party, the charge status of the electric vehicle in response to receiving the charging status query.

According to another aspect, when providing notification, to a third party, the charge status of the electric vehicle, the system controller is further adapted to provide a visual representation of the current level of charge of the electric vehicle and the time left until the charging of the electric vehicle is complete, wherein, the third party receives the visual representation of the current level of charge of the electric vehicle and the time left until the charging of the electric vehicle is complete.

According to another aspect, when providing a visual representation of the current level of charge of the electric vehicle and the time left until the charging of the electric vehicle is complete, the system controller is further adapted to display, with an internal/external display system in communication with the system controller and adapted to project information onto a window surface of the vehicle, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, when providing a visual representation of the current level of charge of the electric vehicle and the time left until the charging of the electric vehicle is complete, the system controller is further adapted to display, with a display of the electric vehicle, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, when providing a visual representation of the current level of charge of the electric vehicle and the time left until the charging of the electric vehicle is complete, the system controller is further adapted to display, with a display screen of the charging station, at least one of: the current level of charge of the electric vehicle and the time left until the charging of the electric vehicle is complete, a graphic representation of the current level of charge of the electric vehicle and the time left until the charging of the electric vehicle is complete, and a QR Code including the current level of charge of the electric vehicle and the time left until the charging of the electric vehicle is complete.

According to another aspect, when providing notification, to a third party, the charge status of the electric vehicle, the system controller is further adapted to: upload the current level of charge of the electric vehicle and the time left until the charging of the electric vehicle is complete to a cloud-based charging station network, wherein the cloud-based charging station is adapted to allow access by the third party, and the third party receives the current level of charge of the electric vehicle and the time left until the charging of the electric vehicle is complete from the cloud-based charging station network, and send notification to the third party that the charging station to which the electric vehicle is connected has malfunctioned.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
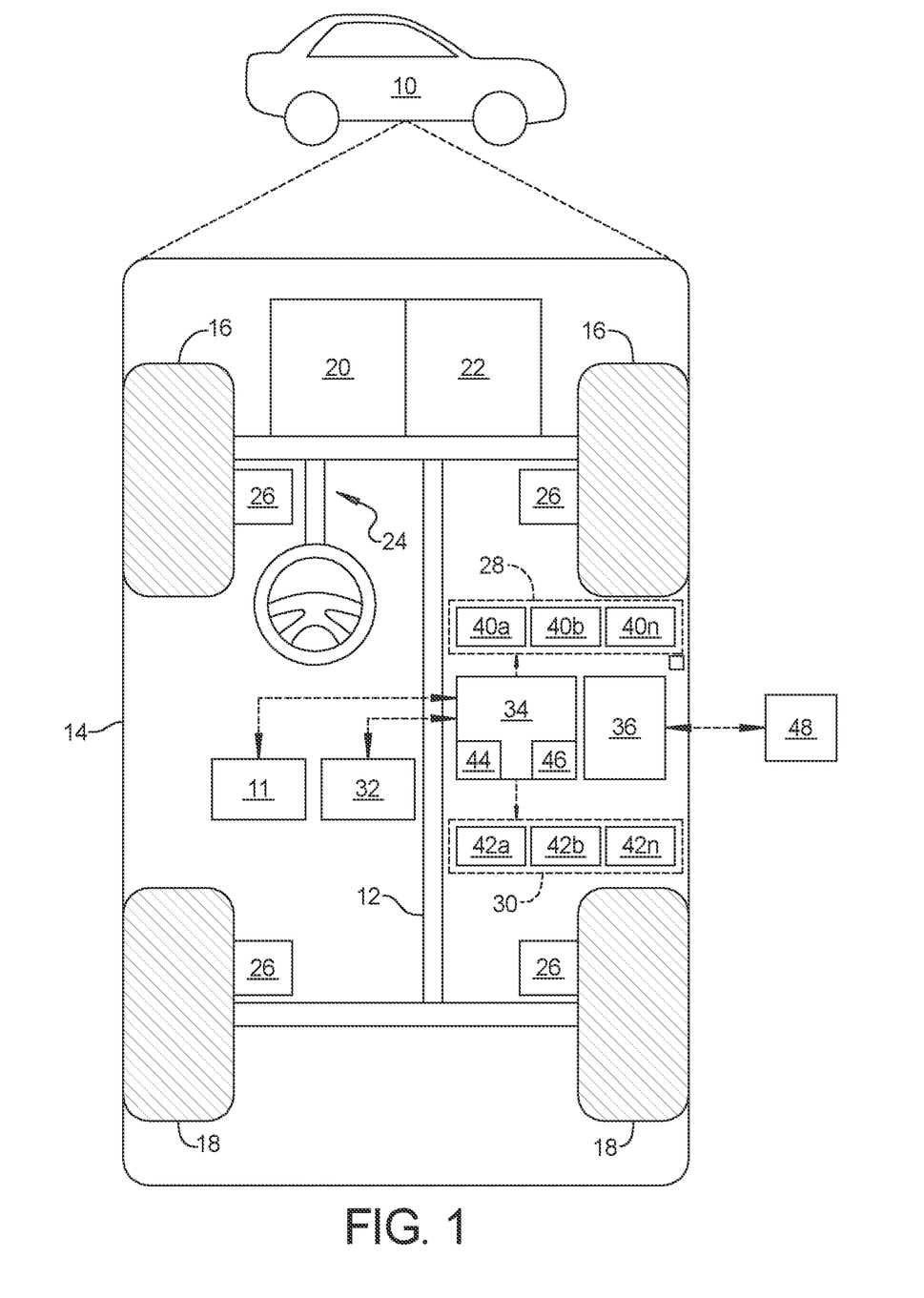
FIG. 1 is a schematic diagram of a vehicle having a system in accordance with an exemplary embodiment of the present disclosure.

In accordance with an exemplary embodiment, FIG. 1 shows an electric vehicle 10 with an associated system 11 for providing information related to a charge status of the electric vehicle 10 when the electric vehicle is connected to a charging station in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield 56 of the vehicle 10. In another example, at least one of the plurality of sensing devices 40a-40n is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
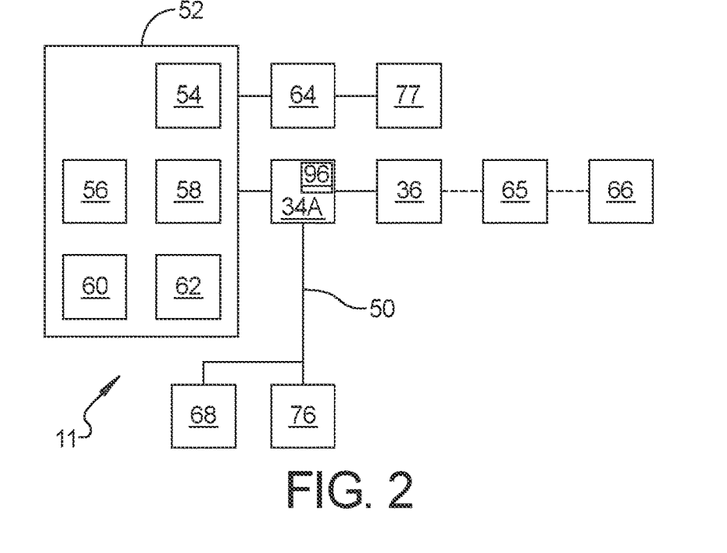
FIG. 2 is a schematic diagram of a system according to an exemplary embodiment.

Referring to FIG. 2, the system 11 is shown in more detail, wherein, the system 11 includes a system controller 34A. The system controller 34A may be the vehicle controller 34, or the system controller 34A may be a separate controller in communication with the vehicle controller 34. The system controller 34A is in communication, over a vehicle communication bus 50, with an electrical system 52 of the electric vehicle 10. The electrical system 52 includes a battery pack 54, power inverter 56, electric motor 58, onboard battery charger 60 and a battery management system 62.

The system controller 34A is adapted to monitor information related to a charge status of the electric vehicle 10 when the electric vehicle 10 is connected to a charging station 64. In an exemplary embodiment, the system controller 34A is adapted to monitor a level of charge of the electrical system 52 within the electric vehicle 10 and a time left until the charging of the electric vehicle 10 is complete.

In an exemplary embodiment, the system controller 34A is adapted to calculate a pre-determined threshold based on at least one of a time until the electric vehicle 10 is fully charged and a time until the level of charge of the electric vehicle 10 is sufficient to allow the electric vehicle 10 to travel from a current location to a planned destination. For example, the pre-determined threshold may be based on when the electric vehicle 10 is fully charged, wherein, when the electric vehicle 10 is plugged into a charging station 64, the system controller 34A will monitor the charging of the electric vehicle 10 and the time left until the electric vehicle 10 is charged to the pre-determined threshold will be the time left until the electric vehicle 10 is fully charged. In another example, the electric vehicle 10 may be located at a charging station 64 that is one hundred miles from the owner's home. In order to ensure that the owner of the electric vehicle 10 spends as little time as possible at the charging station 64, the pre-determined threshold is based on when the electric vehicle 10 is charged to a sufficient level to allow the electric vehicle 10 to travel from the charging station 64 to the owner's home, or the next charging station 64. Possibly, the electric vehicle 10 will only need to be charged to 35% or more to ensure that the electric vehicle 10 will be able to travel the one hundred miles to the owner's home, wherein the owner can plug the electric vehicle 10 into a home charger to fully charge the electric vehicle 10.

When calculating the pre-determined threshold, the system controller 34A receives information related to the planned destination from at least one of input from a user of the electric vehicle 10, and input from a navigation system within the electric vehicle 10, wherein the planned destination is one of a charging station or a home location. The system controller 34A receives information for the planned destination, which is the destination of the electric vehicle 10 after the electric vehicle 10 leaves a current location. Information about the planned destination may be entered directly, or the system controller 34A may gather such information by accessing a navigation system or a personal device of a driver of the electric vehicle 10.

In another example, the system controller 34A receives information for the planned destination, even when a planned destination has not been indicated. The system controller, via communication with electric vehicle charging station infrastructure networks can identify how far it is to the next available charging station 64 and designate that charging station 64 as the planned destination. In this example, the system controller 34A receives information that the electric vehicle 10 will need to travel at least one hundred miles from the current location to the planned destination (closest available charging station). The electric vehicle 10 will need at least a 25% charge to travel one hundred miles, so the system controller 34A sets the pre-determined threshold at 25%. Thus, the system controller 34A calculates the time remaining until charging of the electric vehicle 10 is complete by calculating the time it will take for the electric vehicle 10 to be charged up to the pre-determined threshold.

In another exemplary embodiment, the pre-determined threshold is automatically calculated with a safety margin to accommodate for unexpected stops or detours. For example, if the electric vehicle 10 needs 25% battery charge to travel one hundred miles to the person's 66 home, the system controller 34A will calculate the pre-determined threshold as 25%, the minimum battery charge necessary to travel the one hundred miles, plus an additional 10% to account for an unexpected stop or a detour due to construction or traffic, etc. Thus, the pre-determined threshold in this example is calculated at 35%.

In another exemplary embodiment, when calculating the pre-determined threshold, the system controller 34A receives information related to the planned destination from stored history of previous trip patterns. For example, if an electric vehicle 10 has been located at a particular location regularly over a period of time, such as six months, and over that six-month time frame, each day, the electric vehicle 10 travels, first, from that location to a convenience store, then to a day care center to pick up a child, and then to the driver's home. The system controller 34A may recognize this pattern, and determine the planned destination (convenience store, day care center, then home) and calculate the pre-determined threshold based on assuming that pattern will be repeated, even when no direct information is provided on what the planned destination is.

The system controller 34A is further adapted to provide notification, to a third party 66, information related to a charge status of the electric vehicle 10, including, at least one of (1) a level of charge of the electrical system 52 within the electric vehicle 10, and (2) a time left until charging of the electric vehicle 10 is complete. The third party 66 may be a person 66A, or a third-party electric vehicle 66B. In an exemplary embodiment, the system controller 34A is adapted to receive a charging status query from the third-party 66. The third party 66 initiates the charging status query based on at least one of (1) in response to manual initiation by the third party 66, (2) automatically, based on third party navigation and destination information, and (3) automatically, based on battery charge level of a third-party vehicle 66B and proximity to the charging station 64, wherein, the system controller 34A provides notification, to the third-party 66, the charge status of the electric vehicle 10 in response to receiving the charging status query.

Figure 3:
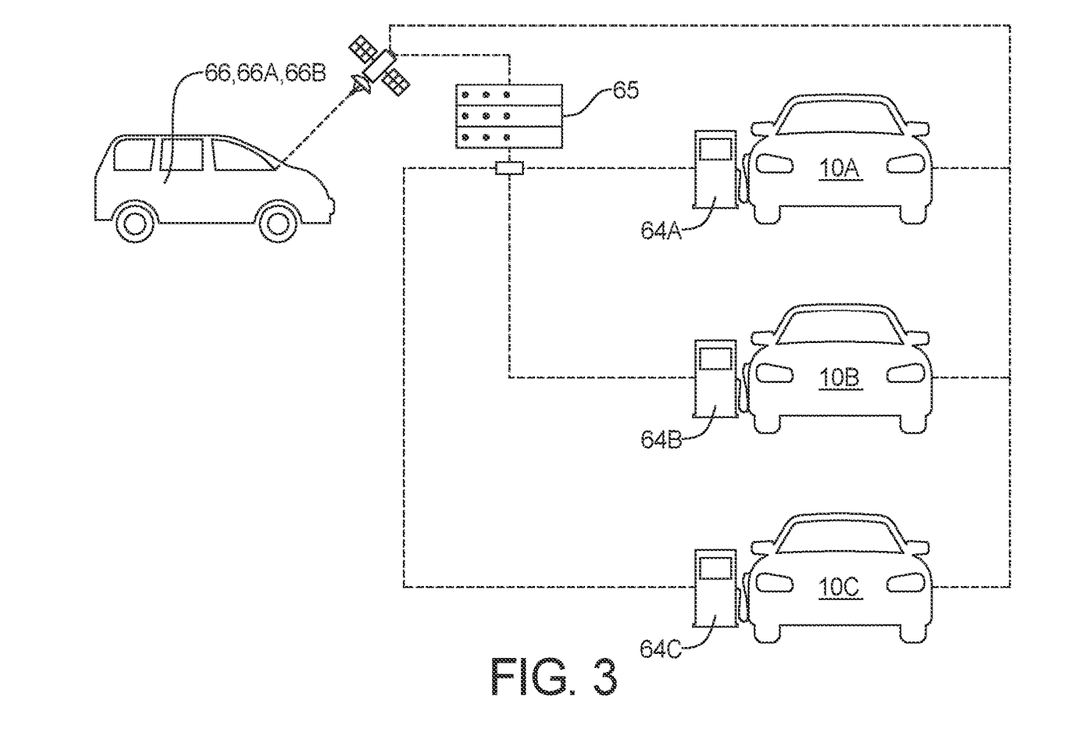
FIG. 3 is a schematic diagram of a third-party vehicle receiving notifications from several electric vehicles via a cloud-based charging station network.

Referring to FIG. 3, for example, the third party 66 may manually initiate a charging status query, wherein the third party 66 is a driver 66A of a third-party electric vehicle 66B, notices that the level of charge of the third-party electric vehicle 66B is getting low and also notices that the third-party electric vehicle 66B is approaching a charging station 64. The third party driver 66A may initiate a charging status query to find out how long they may have to wait for availability of the upcoming charging station 64. As shown, the third-party electric vehicle 66B is approaching three potential charging stations 64A, 64B, 64C. The three potential charging stations 64A, 64B, 64C may be individual charging stations at a specific location, or may be individual charging stations located at different locations. The third party driver 66A initiates a charging status query, wherein the system controller 34A, via wireless communication with a charging station network 65, identifies the three potential charging stations 64A, 64B, 64C.

In an exemplary embodiment, the charging station network 65 is a cloud-based application or network service that communicates with all charging stations 64A, 64B, 64C to manage availability, appropriateness for an electric vehicle 10, and functionality of charging stations 64A, 64B, 64C. In another example, the onboard systems of the third-party electric vehicle 66B detect that the third-party electric vehicle 66B will need to re-charge before reaching its' final destination, based on the battery charge level of the third-party electric vehicle 66B and communication with the third-party electric vehicle's 66B navigation systems. Further, the onboard systems of the third-party electric vehicle 66B detect that the third-party electric vehicle 66B is approaching the three potential charging stations 64A, 64B, 64C, based on wireless communications with the charging station network 65. The onboard systems of the third-party electric vehicle 66B will automatically initiate a charging status query to evaluate the availability of the three potential charging stations 64A, 64B, 64C based on the charging status of three electric vehicles 10A, 10B, 10C connected to them. For each of the electric vehicles 10A, 10B, 10C, the system controller 34A is adapted to upload the current level of charge and the time remaining until charging is complete to the cloud-based charging station network 65. The cloud-based charging station network 65 is adapted to allow access by authorized third parties 66. The onboard systems of the third-party electric vehicle 66B may then access the cloud-based charging station network 65, receive data related to the charging status of the electric vehicles 10A, 10B, 10C, and compare availability (vacant/occupied, time until charging of present electric vehicle 10A, 10B, 10C is complete, functional, appropriate for the third-party electric vehicle 66B) of the potential charging stations 64A, 64B, 64C to either automatically select the best option for charging the third-party electric vehicle 66B (ie. autonomous third-party electric vehicles) or to provide suggestions to the driver 66A of the third-party electric vehicle 66B. Further, if a charging station 64 has malfunctioned, the cloud-based charging station network 65 can provide notification to the third party 66 that a charging station 64 to which the electric vehicle 10 is connected has malfunctioned, thus eliminating that charging station 64 as an option for the third party 66.

In an exemplary embodiment, when providing notification 72, to a third party 66, the charge status of the electric vehicle 10, the system controller 34A is further adapted to provide a visual representation 72A of the current level of charge 74A of the electric vehicle 10 and the time left 74B until the charging of the electric vehicle 10 is complete, wherein, the third party 66 receives the visual representation 72A of the current level of charge 74A of the electric vehicle 10 and the time left 74B until the charging of the electric vehicle 10 is complete.

In an exemplary embodiment, when displaying the visual representation 72A of the current level of charge 74A of the electric vehicle 10 and the time left 74B until the charging of the electric vehicle 10 is complete, the system controller 34A is further adapted to display, with an internal/external display system 68 in communication with the system controller 34A and adapted to project information onto a window surface 70 of the electric vehicle 10, information related to the charge status of the electric vehicle 10, wherein, the projected information related to the charge status of the electric vehicle 10 is visible from within the electric vehicle 10 and from outside the electric vehicle 10. The system controller 34A is adapted to project information including at least one of: (1) the current level of charge 74A of the electric vehicle 10 and the time left 74B until the charging of the electric vehicle 10 is complete, (2) a graphic representation 72B of the current level of charge 74A of the electric vehicle 10 and the time left 74B until the charging of the electric vehicle 10 is complete, and (3) a QR Code 72C including the current level of charge 74A of the electric vehicle 10 and the time left 74B until the charging of the electric vehicle 10 is complete.

Figure 4A:
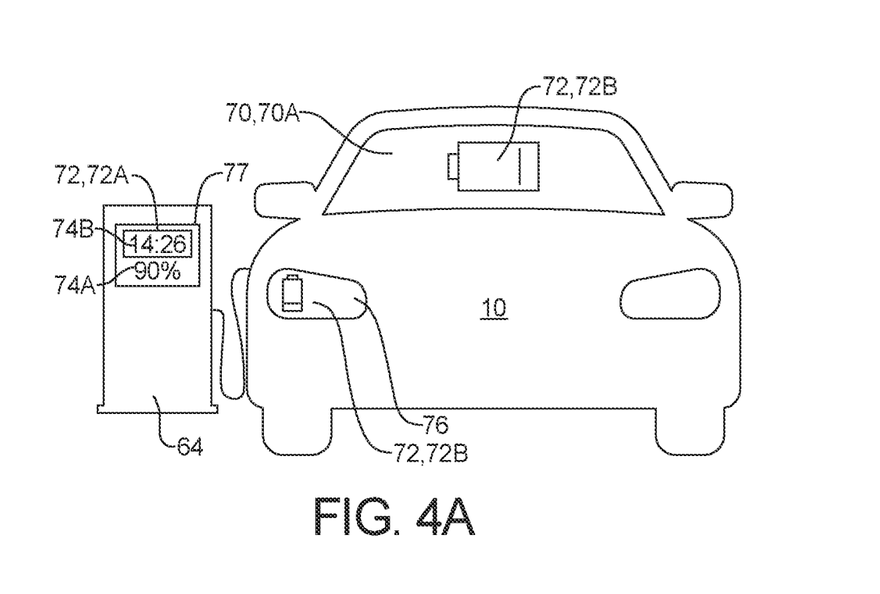
FIG. 4A is a schematic front view of a vehicle that is connected to a charging station.

In an exemplary embodiment, the internal/external display system 68 comprises a hybrid augmented reality head up display (HUD) 68. The system controller 34A uses the HUD 68 to provide a notification 72 of the charge status of the electric vehicle 10 onto the windshield 70A. As shown in FIG. 4A, the system controller 34A uses the internal/external display system 68 to display a graphic representation 72B. As shown, the graphic representation 72B comprises a battery icon with bars indicating a relative level of charge, with one bar being highlighted, thus indicating that the electric vehicle 10 is approximately 20% charged. While, as shown, the graphic representation 72B does not provide a specific time until charging of the electric vehicle is complete, the graphic representation 72B does provide information to allow a driver 66A of a third-party electric vehicle 66B to visually compare different electric vehicles 10 at different charging stations 64. Thus, as a third-party electric vehicle 66B approaches various electric vehicles 10A, 10B, 10C connected to various charging stations 64A, 64B, 64C (as shown in FIG. 3), the driver of the third-party electric vehicle 66B can look at the displayed notification 72 to evaluate the status of the different charging stations 64A, 64B, 64C and decide which one is the best option, thereafter, entering a que for the selected charging station 64. Further, while waiting, the driver 66A of the third-party electric vehicle 66B can look at the displayed notification 72 on electric vehicles 10 parked at nearby or adjacent charging stations 64 to continually monitor their charging status, and if appropriate, move to a different charging station 64 if the waiting time becomes less than the charging station 64 where the third-party vehicle 66B is currently in line.

Figure 4B:
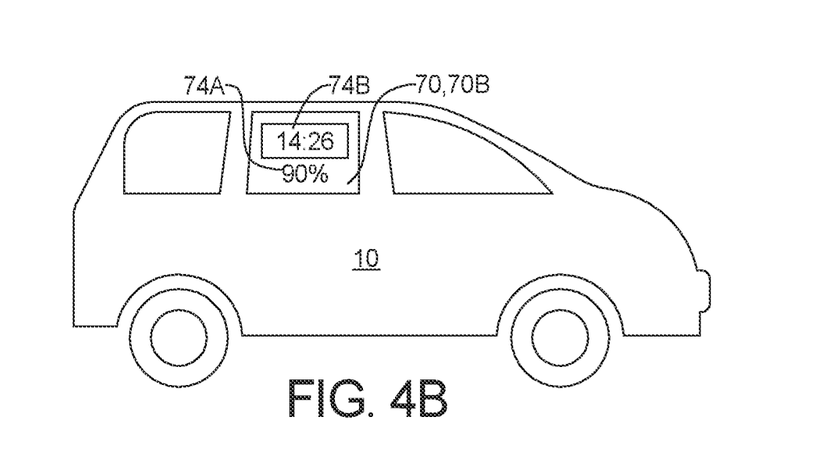
FIG. 4B is a schematic side view of the vehicle shown in FIG. 4A.

Likewise, referring to FIG. 4B, in another exemplary embodiment, the system controller 34A uses the HUD 68 to display the current charge level 74A of the electric vehicle 10 and the calculated time 74B until charging of the electric vehicle 10 is complete onto a side window 70B. The displayed current charge level 74A and time remaining 74B may be represented with textual information, such as shown in FIG. 4B, or may be shown with a graphic representation 72B that provide an illustrative representation of the information, as shown in FIG. 4A.

Figure 4C:
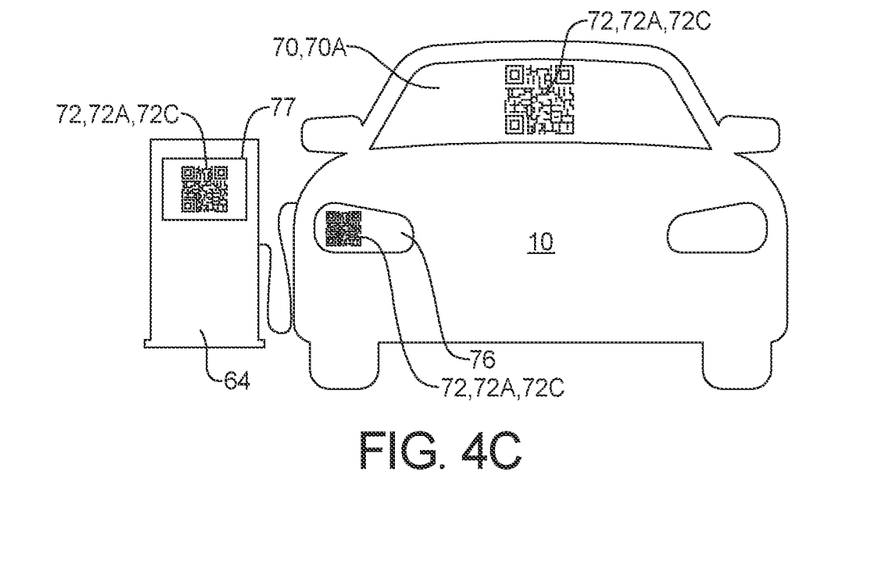
FIG. 4C is schematic front view of a vehicle that is connected to a charging station and is providing notification by way of a QR Code displayed on the front windshield.

Referring to FIG. 4C, in another exemplary embodiment, the system controller 34A uses the HUD 68 to display a QR Code 72C including the current level of charge 74A of the electric vehicle 10 and the time left 74B until the charging of the electric vehicle 10 is complete onto either the windshield 70A or the side window 70B. The QR code 72C provides a visual representation 72A of information that can be read by cameras on a third-party vehicle 66B from a distance greater than could be visually identified by a human third party 66A. Further, a displayed QR Code 72C provides the information in a manner that can only be recognized by third party vehicles 66B that are authorized to get the information, such as third party vehicles 66B that have submitted a query through an authorized charging station network 65.

Thus, as a third-party electric vehicle 66B approaches various electric vehicles 10A, 10B, 10C connected to various charging stations 64A, 64B, 64C, cameras within the third-party vehicle 66C capture images of QR Codes 72C displayed by electric vehicles 10A, 10B, 10C connected to the various charging stations 64A, 64B, 64C to evaluate the status of the different charging stations 64A, 64B, 64C and decide which one is the best option, wherein, the onboard systems of the third-party vehicle 66B can recommend a charging station 64 to the driver 66A of the third-party vehicle 66B, or, in the case of an autonomous vehicle, automatically select and enter a que for the selected charging station 64. Further, while waiting, the onboard systems of the third-party vehicle 66B can monitor displayed QR Codes 72C on electric vehicles 10 parked at nearby or adjacent charging stations 64 to continually monitor their charging status, and if appropriate, move to a different charging station 64 if the waiting time becomes less than the charging station 64 where the third-party vehicle 66B is currently in line.

In another exemplary embodiment, when providing a visual representation 72A of the current level of charge 74A of the electric vehicle 10 and the time left 74B until the charging of the electric vehicle 10 is complete, the system controller 34A is further adapted to display, with a display 76 of the electric vehicle 10, at least one of (1) the current level of charge 74A of the electric vehicle 10 and the time left 74B until the charging of the electric vehicle 10 is complete, (2) a graphic representation 72B of the current level of charge 74A of the electric vehicle 10 and the time left 74B until the charging of the electric vehicle 10 is complete, and (3) a QR Code 72C including the current level of charge 74A of the electric vehicle 10 and the time left 74B until the charging of the electric vehicle 10 is complete.

Referring again to FIG. 4A, a graphical representation 72B of a charging battery is displayed on a display 76 mounted to the electric vehicle 10. As shown, the graphical representation 72B displayed with the display 76 is the same graphical representation 72B displayed on the front windshield 70A. As shown, the display 76 is incorporated into a headlight assembly of the electric vehicle 10. In such instance, the headlight may be an LED light array, or an OLED display, adapted to display information related to the current charge 74A of the electric vehicle 10 and/or a time left 74B until charging of the electric vehicle 10 is complete. Referring again to FIG. 4C, a QR Code 72C is displayed on the display 76. It should be understood that such display 76 may be incorporated into a headlight assembly (as shown in FIG. 4A and FIG. 4C) or tail-light assembly of the electric vehicle 10, or may be mounted independently onto an exterior surface of the electric vehicle 10, separate from either the headlight assembly or tail-light assembly.

In another exemplary embodiment, when providing a visual representation 72A of the current level of charge 74A of the electric vehicle 10 and the time left 74B until the charging of the electric vehicle 10 is complete, the system controller 34A is further adapted to display, via communication with a connected charging station 64, with a display screen 77 of the charging station 64, at least one of (1) the current level of charge 74A of the electric vehicle 10 and the time left 74B until the charging of the electric vehicle 10 is complete, (2) a graphic representation 72B of the current level of charge 74A of the electric vehicle 10 and the time left 74B until the charging of the electric vehicle 10 is complete, and (3) a QR Code 72C including the current level of charge 74A of the electric vehicle 10 and the time left 74B until the charging of the electric vehicle 10 is complete.

Referring again to FIG. 4A, textual data including the current charge level 74A of the electric vehicle 10 and the time 74B until the charging of the electric vehicle 10 is complete is displayed on the display screen 77 of the charging station 64. Referring again to FIG. 4C, a QR Code 72C is displayed on the display screen 77 of the charging station 64.

Thus, as shown in FIG. 4A, FIG. 4B and FIG. 4C, according to the examples provided above, the system controller 34A provides a visual representation 72A of a notification 72 of the current level of charge 74A of the electric vehicle 10 and the time left 74B until the charging of the electric vehicle 10 is complete.

Displaying information such as the level of charge 74A of the electric vehicle 10, and the time remaining 74B until charging of the electric vehicle 10 is complete with the internal/external display system 68 such as the HUD 68, allows a third party (either driver 66A of a third-party vehicle 66B or onboard systems of a third-party vehicle 66B) to see the displayed information, and use the displayed information to make strategic decisions regarding when to charge the third-party vehicle 66B and selection of an appropriate charging station 64.

Figure 5:
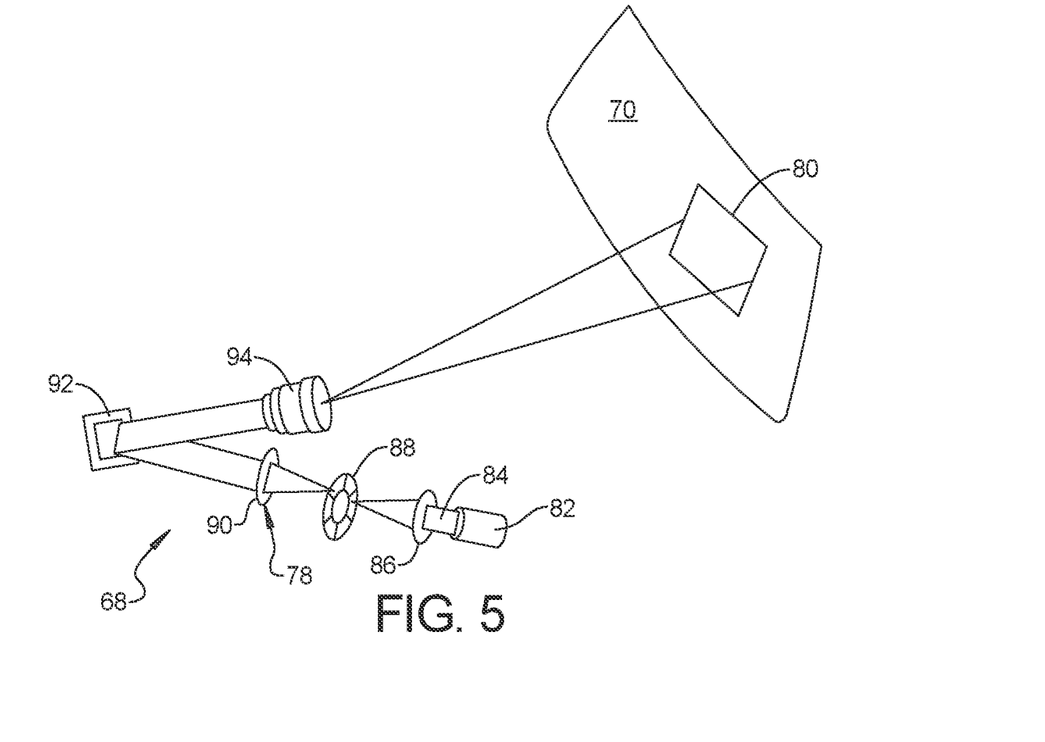
FIG. 5 is a schematic view of a hybrid augmented reality head up display system for the system.

The internal/external display system 68 may use any suitable transparent display technology to display information onto the window surfaces 70 of the vehicle 10 to be viewed by persons both internally and externally, or, to be viewed only by persons external to the vehicle 10. Referring to FIG. 5, in an exemplary embodiment, the HUD 68 includes a digital light processing (DLP) projector 78 adapted to project images 80 onto a window surface 70 of the vehicle 10. The DLP 78 projects an image 80 that may contain various information, such as, by way of example, the level of charge 74, 74A, time remaining 76, warning message 76A and/or graphics 76B, as shown in FIG. 3, FIG. 4 and FIG. 5. The DLP 78 is capable of projecting two-dimensional and three-dimensional images. In an exemplary embodiment, the DLP 78 includes a light source 82 adapted to project an excitation light 84, a condensing lens 86 adapted to focus the excitation light 84 from the light source 82, a color filter 88 (color wheel) adapted to split the focused excitation light 84 into red, green and blue light, a shaping lens 90 adapted to focus the excitation light 84 passing through the color filter 88, a digital micro-mirror device (DMD) 92 adapted to re-direct the excitation light 84, and a projection lens 94 adapted to receive the excitation light 84 from the digital micro-mirror device (DMD) 92 and project the excitation light 84 to the window surface 70.

Referring to FIG. 2, the system controller 34A includes a DLP engine 96. The DLP engine 96 includes a programmable processor including programming to monitor various inputs and determine what information is appropriate to display. The DLP engine 96 can communication directly with various systems and components, or the DLP engine 96 can alternatively or additionally communicate over a LAN/CAN system. The window surfaces 70, 70A, 70B are equipped with features capable of displaying an image projected thereupon while remaining transparent or substantially transparent such that occupants within the vehicle 10 can clearly see displayed images 80 and still observe outside of the vehicle 10 through the window surfaces 70, 70A, 70B, and persons 66A outside of the electric vehicle 10 can clearly see displayed images 80 and still observe within of the electric vehicle 10 through the window surfaces 70, 70A, 70B.

The DLP engine 96 includes display software or programming translating requests to display information from the DLP engine 96 in graphical representations describing the information. The DLP engine 96 includes programming to compensate for the curved and tilted surface of the window surfaces 70, 70A, 70B. The DLP engine 96 controls the light source 82 which includes a laser or projector device producing an excitation light 84 to project the images 80.

Figure 6:
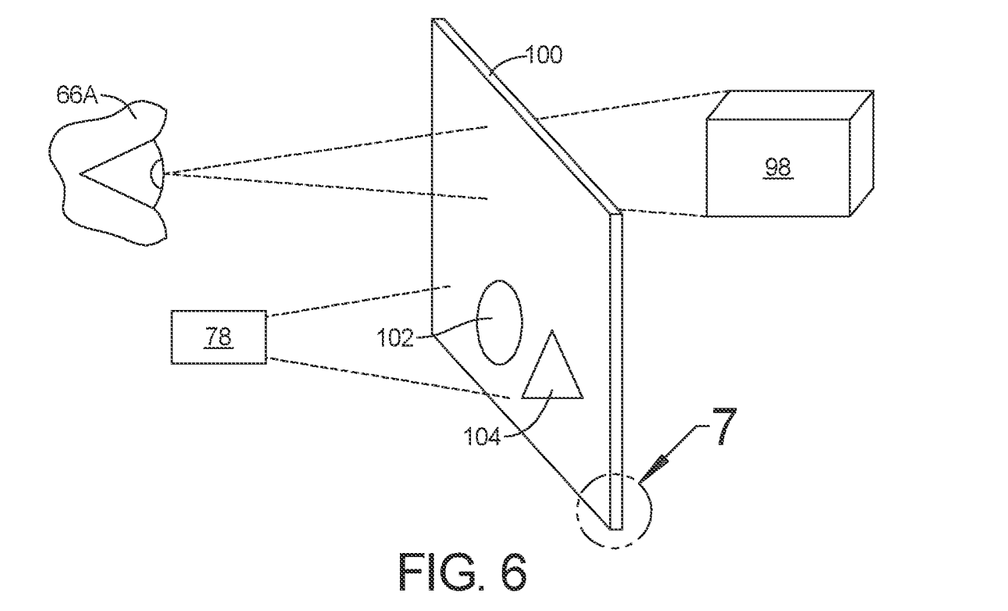
FIG. 6 is schematic illustration of a substrate for the windshield of the electric vehicle according to an exemplary embodiment.
Figure 7:
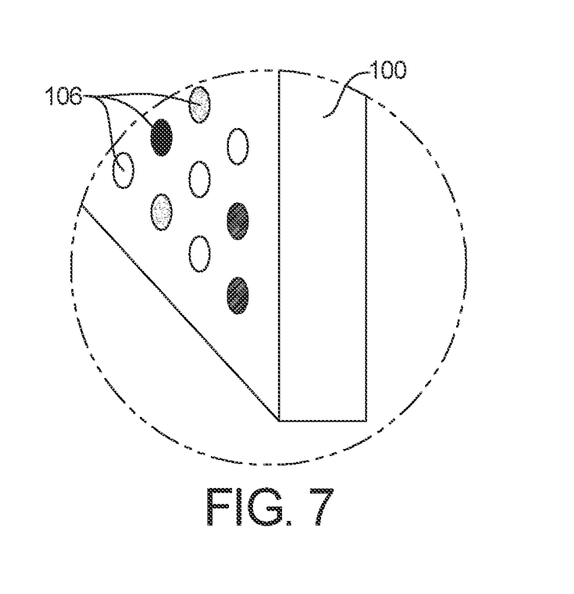
FIG. 7 is a enlarged portion of FIG. 6, as indicated by the circle labelled "7" in FIG. 6.

The window surfaces 70, 70A, 70B function as a medium through which relevant features are observable while serving as a display device upon which images 80, such as the current charge 74A of the electric vehicle 10 and the time remaining 74B until charging of the electric vehicle 10 is complete, as shown in FIG. 4A, FIG. 4B and FIG. 4C, may be displayed. The window surfaces 70, 70A, 70B are both transparent and capable of displaying images projected by an excitation light 84. Referring to FIG. 6 and FIG. 7, a person 66A is able to see an arbitrary object (e.g. cube 98) through a substrate 100 positioned on the window surfaces 70, 70A, 70B. The substrate 100 may be transparent or substantially transparent. While the person 66A sees the arbitrary object 98 through the substrate 100, the person 66A can also see images (e.g. circle 102 and triangle 104) that are created at the substrate 100. The substrate 100 may be part of the window surfaces 70, 70A, 70B, a glass substrate, a plastic substrate, a polymer substrate, or other transparent (or substantially transparent) medium that would be appreciated by one of ordinary skill in the art. Other substrates may complement the substrate 100 to provide for tinting, substrate protection, light filtering (e.g. filtering external ultraviolet light), and other functions.

Figure 8:
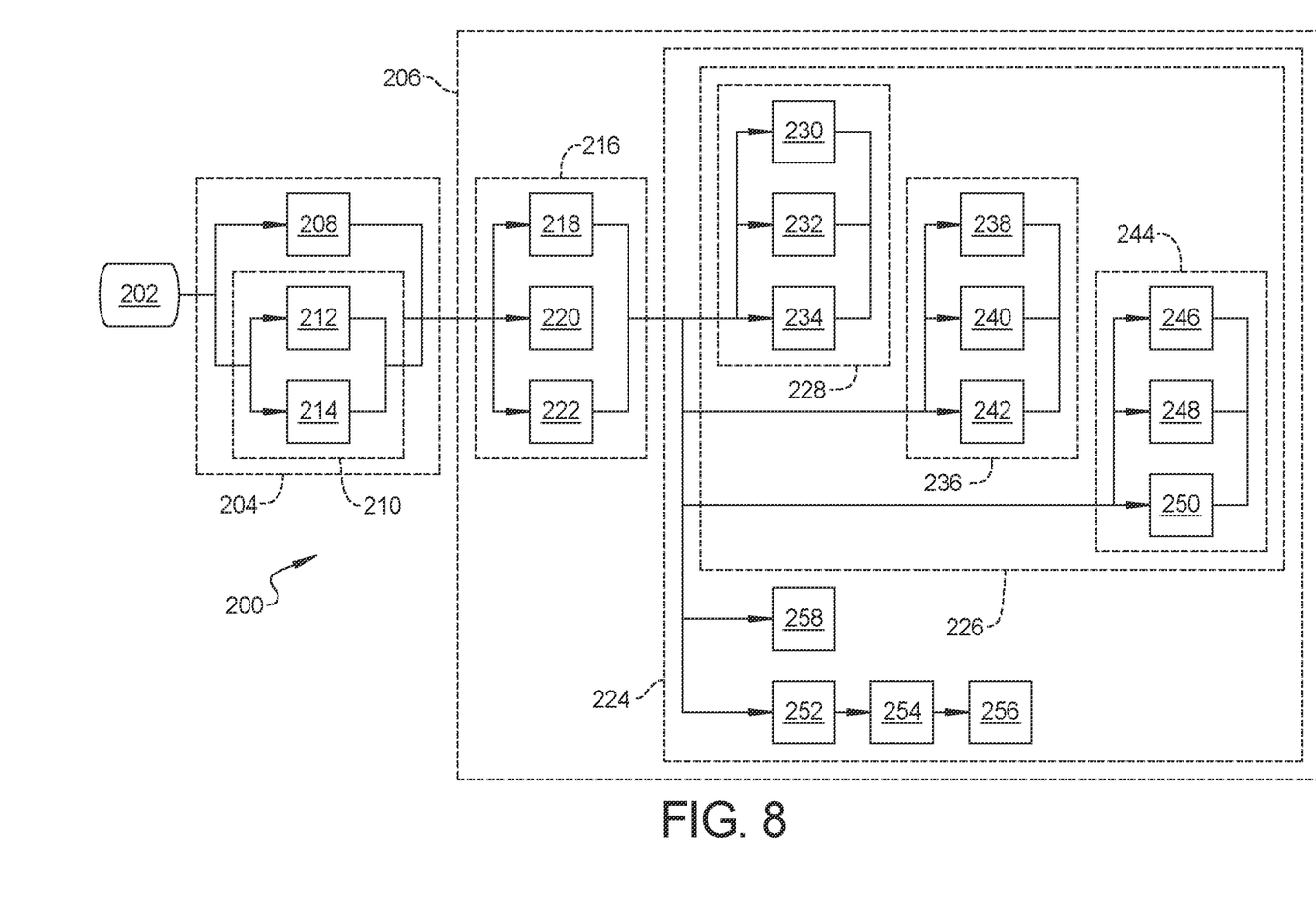
FIG. 8 is a flow chart illustrating a method according to an exemplary embodiment.

FIG. 8 depicts illumination of transparent displays illuminated with excitation light 84 (e.g. ultraviolet light from a light source 82. The substrate 100 receives excitation light 84 from the light source 82. The received excitation light 84 may be absorbed by light emitting material 106 at the substrate 100. When the light emitting material receives the excitation light 84, the light emitting material 106 emits visible light. Accordingly, images (e.g. circle 102 and triangle 104) may be created at the substrate 100 by selectively illuminating the substrate 100 with excitation light 84.

In an exemplary embodiment, the light emitting material 106 includes transparent phosphors that are embedded into the substrate 100. The transparent phosphors are light emitting particles which fluoresce in response to being excited by the excitation light 84. In an exemplary embodiment, the transparent phosphors are red, green, and blue (RGB) phosphors, allowing full color. The use of monochrome and/or two-color phosphors is also within the scope of the present disclosure. When excitation light 84 is absorbed by the transparent phosphors, visible light is emitted by the transparent phosphors. The excitation light 84 is provided by the light source 82. Use of the substrate 100 and light emitting material 106 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

The excitation light 84 may be ultraviolet light, in accordance with embodiments of the present disclosure. If the excitation light 84 is ultraviolet light, then when the light emitting material 90 emits visible light in response to the ultraviolet light, a down-conversion physical phenomenon occurs. Specifically, ultraviolet light has a shorter wavelength and higher energy than visible light. Accordingly, when the light emitting material 106 absorbs the ultraviolet light and emits lower energy visible light, the ultraviolet light is down-converted to visible light because the ultraviolet light's energy level goes down when it is converted into visible light.

As shown in FIG. 5, the excitation light 84 is output by the light source 82 of the DLP 78. In an exemplary embodiment, the light source 82 is a micro-mirror array (MMA) projector (e.g. a digital light processing (DLP) projector 78). In the DLP 78, the images 80 are created by microscopically small mirrors laid out in a matrix on a semiconductor chip within the DMD 92. An MMA projector that outputs ultraviolet light may be similar to a MMA projector that outputs visible light, except that the color filter 68 has light filters that are tailored to the ultraviolet light spectrum. In other embodiments, the DLP 78 is a liquid crystal display (LCD) projector. In embodiments, the DLP 78 may be a liquid crystal on silicon (LCOS) projector. In embodiments, the DLP 78 may be an analog projector (e.g. a slide film projector or a movie film projector). One of ordinary skill in the art would appreciate other types of projectors which may be used to project ultraviolet light on the substrate 100.

Referring to FIG. 8, a method 200 of providing information related to a charge status of an electric vehicle 10 when the electric vehicle 10 is connected to a charging station 64 includes, beginning at block 202, and moving to block 204, monitoring, with a system controller 34A in communication with an electrical system 52 within the electric vehicle 10, information related to a charge status of the electric vehicle 10, and, moving to block 206, providing notification, to a third-party 66, with the system controller 34A, the charge status of the electric vehicle 10.

In an exemplary embodiment, the monitoring, with the system controller 34A in communication with the electrical system 52 within the electric vehicle 10, information related to a charge status of the electric vehicle 10 at block 204 further includes monitoring, with the system controller 34, at least one of, moving to block 208, a level of charge 74A of the electrical system 52 within the electric vehicle 10, and, moving to block 210, a time left until the charging of the electric vehicle is complete. The monitoring, with the system controller 34A, a time left 74B until the charging of the electric vehicle 10 is complete further includes calculating a time until one of, moving to block 212, when the electric vehicle 10 is fully charged, and, moving to block 214, when the electric vehicle 10 is charged sufficiently to allow the electric vehicle 10 to travel from the charging station 64 to a planned destination.

In another exemplary embodiment, the providing notification 72, to a third-party 66, with the system controller 34A, the charge status of the electric vehicle 10 at block 206 further includes, moving to block 216, receiving, with the system controller 34A of the electric vehicle 10, a charging status query from a third-party 66, wherein the third party 66 initiates the charging status query based on at least one of, moving to block 218, in response to manual initiation by the third party 66, moving to block 220, automatically based on third party navigation and destination information, and, moving to block 222, automatically based on battery charge level of the third party 66 and proximity to the charging station 64, and, moving to block 224, providing notification 72, to the third-party 66, with the system controller 34A, the charge status of the electric vehicle 10 in response to receiving the charging status query.

In an exemplary embodiment, the providing notification 72, to a third party 66, with the system controller 34A, the charge status of the electric vehicle 10 at block 206 further includes, moving to block 226, providing a visual representation 72A of the current level of charge 74A of the electric vehicle 10 and the time left 74B until the charging of the electric vehicle 10 is complete, and, receiving, by the third party 66, the visual representation 72A of the current level of charge 74A of the electric vehicle 10 and the time left 74B until the charging of the electric vehicle 10 is complete.

In an exemplary embodiment, the providing a visual representation 72A of the current level of charge 74A of the electric vehicle 10 and the time left 74B until the charging of the electric vehicle 10 is complete at block 226 further includes, moving to block 228, displaying, with an internal/external display system 68 in communication with the system controller 34A and adapted to project information onto a window surface 70 of the electric vehicle 10, at least one of, moving to block 230, the current level of charge 74A of the electric vehicle 10 and the time left 74B until the charging of the electric vehicle 10 is complete, moving to block 232, a graphic representation 72B of the current level of charge 74A of the electric vehicle 10 and the time left 74B until the charging of the electric vehicle 10 is complete, and, moving to block 234, a QR Code 72C including the current level of charge 74A of the electric vehicle 10 and the time left 74B until the charging of the electric vehicle 10 is complete.

In an exemplary embodiment, the providing a visual representation 72A of the current level of charge 74A of the electric vehicle 10 and the time left 74B until the charging of the electric vehicle 10 is complete at block 226 further includes, moving to block 236, displaying, with the system controller 34A, via a display 76 of the electric vehicle 10, at least one of, moving to block 238, the current level of charge 74A of the electric vehicle 10 and the time left 74B until the charging of the electric vehicle 10 is complete, moving to block 240, a graphic representation 72B of the current level of charge 74A of the electric vehicle 10 and the time left 74B until the charging of the electric vehicle 10 is complete, and, moving to block 242, a QR Code 72C including the current level of charge 74A of the electric vehicle 10 and the time left 74B until the charging of the electric vehicle 10 is complete.

In an exemplary embodiment, the providing a visual representation 72A of the current level of charge 74A of the electric vehicle 10 and the time left 74B until the charging of the electric vehicle 10 is complete at block 226 further includes, moving to block 244, displaying, with the system controller 34A, via a display screen 77 of the charging station 64, at least one of, moving to block 246, the current level of charge 74A of the electric vehicle 10 and the time left 74B until the charging of the electric vehicle 10 is complete, moving to block 248, a graphic representation 72B of the current level of charge 74A of the electric vehicle 10 and the time left 74B until the charging of the electric vehicle 10 is complete, and, moving to block 250, a QR Code 72C including the current level of charge 74A of the electric vehicle 10 and the time left 74B until the charging of the electric vehicle 10 is complete.

In another exemplary embodiment, the providing notification, to a third party 66, with the system controller 34A, the charge status of the electric vehicle 10 at block 224 further includes, moving to block 252, uploading, with the system controller 34A, the current level of charge 74A of the electric vehicle 10 and the time left 74B until the charging of the electric vehicle 10 is complete to a cloud-based charging station network 65, moving to block 254, accessing, by the third party 66, the cloud-based charging station network 65, and, moving to block 256, receiving, by the third party 66, from the cloud-based charging station network 65, the current level of charge 74A of the electric vehicle 10 and the time left 74B until the charging of the electric vehicle 10 is complete.

In still another exemplary embodiment, the providing notification 72, to a third party 66, with the system controller 34A, the charge status of the electric vehicle 10 at block 224 further includes, moving to block 258, sending, with the system controller 34A, notification 72 to the third party 66 that the charging station 64 to which the electric vehicle 10 is connected has malfunctioned.

A system 11 and method 200 of the current disclosure offers the advantage of providing information related to a charge status of an electric vehicle when the electric vehicle is connected to a charging station to a third party, whereby the third party can strategically select a charging station that minimizes the time spent waiting for such charging station.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing information related to a charge status of an electric vehicle when the electric vehicle is connected to a charging station, comprising:
monitoring, with a system controller in communication with an electrical system within the electric vehicle, information related to a charge status of the electric vehicle; and
providing notification, to a third-party, with the system controller, the charge status of the electric vehicle, wherein the third-party is a third-party electric vehicle or a user of the third-party electric vehicle, and providing notification includes:
displaying, with a hybrid augmented reality head up display (HUD) in communication with the system controller and adapted to project information onto a window surface of the electric vehicle that is visible to both occupants within the electric vehicle and persons outside of the electric vehicle, at least one of:
a current level of charge of the electric vehicle and a time left until the charging of the electric vehicle is complete;
a graphic representation of the current level of charge of the electric vehicle and the time left until the charging of the electric vehicle is complete; and
a QR Code including the current level of charge of the electric vehicle and the time left until the charging of the electric vehicle is complete.

2. The method of claim 1, wherein the monitoring, with the system controller in communication with the electrical system within the electric vehicle, information related to a charge status of the electric vehicle further includes monitoring, with the system controller, at least one of:
a level of charge of the electrical system within the electric vehicle; and
a time left until the charging of the electric vehicle is complete.

3. The method of claim 2, wherein the monitoring, with the system controller, a time left until the charging of the electric vehicle is complete further includes calculating a pre-determined threshold that is based on at least one of:
a time until the electric vehicle is fully charged; and
a time until the electric vehicle is charged sufficiently to allow the electric vehicle to travel from the charging station to a planned destination, wherein the method includes:
receiving, with the system controller, information related to the planned destination from at least one of:
input from a user of the electric vehicle;
a personal device of a user of the electric vehicle; or
a navigation system within the electric vehicle; or
when information related to the planned destination is not available:
receiving, with the system controller, from a vehicle charging station infrastructure network, information related to a distance to a next available charging station; and
designating the next available charging station as the planned destination.

4. The method of claim 3, wherein the providing notification, to a third-party, with the system controller, the charge status of the electric vehicle further includes:
receiving, with the system controller of the electric vehicle, a charging status query from a third-party, wherein the third party initiates the charging status query based on at least one of:
in response to manual initiation by the third party;
automatically based on third party navigation and destination information; and
automatically based on battery charge level of the third party and proximity to the charging station; and
providing notification, to the third-party, with the system controller, the charge status of the electric vehicle in response to receiving the charging status query.

5. The method of claim 3, wherein the providing notification, to a third party, with the system controller, the charge status of the electric vehicle further includes:
providing a visual representation of the current level of charge of the electric vehicle and the time left until the charging of the electric vehicle is complete; and receiving, by the third party, the visual representation of the current level of charge of the electric vehicle and the time left until the charging of the electric vehicle is complete.

6. The method of claim 5, wherein the providing a visual representation of the current level of charge of the electric vehicle and the time left until the charging of the electric vehicle is complete further includes displaying, with the system controller, via a display of the electric vehicle, at least one of:
the current level of charge of the electric vehicle and the time left until the charging of the electric vehicle is complete;
a graphic representation of the current level of charge of the electric vehicle and the time left until the charging of the electric vehicle is complete; and
a QR Code including the current level of charge of the electric vehicle and the time left until the charging of the electric vehicle is complete.

7. The method of claim 5, wherein the providing a visual representation of the current level of charge of the electric vehicle and the time left until the charging of the electric vehicle is complete further includes displaying, with the system controller, via a display screen of the charging station, at least one of:
the current level of charge of the electric vehicle and the time left until the charging of the electric vehicle is complete;
a graphic representation of the current level of charge of the electric vehicle and the time left until the charging of the electric vehicle is complete; and
a QR Code including the current level of charge of the electric vehicle and the time left until the charging of the electric vehicle is complete.

8. The method of claim 3, wherein the providing notification, to a third party, with the system controller, the charge status of the electric vehicle further includes:
uploading, with the system controller, the current level of charge of the electric vehicle and the time left until the charging of the electric vehicle is complete to a cloud-based charging station network;
accessing, by the third party, the cloud-based charging station network; and
receiving, by the third party, from the cloud-based charging station network, the current level of charge of the electric vehicle and the time left until the charging of the electric vehicle is complete.

9. The method of claim 8, wherein the providing notification, to a third party, with the system controller, the charge status of the electric vehicle further includes sending, with the system controller, notification to the third party that the charging station to which the electric vehicle is connected has malfunctioned.

10. A system for providing information related to a charge status of an electric vehicle when the electric vehicle is connected to a charging station, comprising:
a system controller in communication with an electrical system within the electric vehicle and adapted to:
monitor information related to a charge status of the electric vehicle; and
provide notification, to a third-party, of the charge status of the electric vehicle, wherein the third-party is a third-party electric vehicle or a user of the third-party electric vehicle, wherein the system controller is further adapted to display, with a hybrid augmented reality head up display (HUD) in communication with the system controller and adapted to project information onto a window surface of the electric vehicle that is visible to both occupants within the electric vehicle and persons outside of the electric vehicle, at least one of:
the current level of charge of the electric vehicle and the time left until the charging of the electric vehicle is complete;
a graphic representation of the current level of charge of the electric vehicle and the time left until the charging of the electric vehicle is complete; and
a QR Code including the current level of charge of the electric vehicle and the time left until the charging of the electric vehicle is complete.

11. The system of claim 10, wherein when monitoring information related to a charge status of the electric vehicle, the system controller is further adapted to monitor a level of charge of the electrical system within the electric vehicle, and a time left until the charging of the electric vehicle is complete.

12. The system of claim 11, wherein when monitoring a time left until the charging of the electric vehicle is complete the system controller is further adapted to calculate a pre-determined threshold that is based on at least one of:
a time until the electric vehicle is fully charged; and
a time until the electric vehicle is charged sufficiently to allow the electric vehicle to travel from the charging station to a planned destination, wherein the system controller is further adapted to:
receive information related to the planned destination from at least one of:
input from a user of the electric vehicle;
a personal device of a user of the electric vehicle; or
a navigation system within the electric vehicle; or
when information related to the planned destination is not available:
receive, from a vehicle charging station infrastructure network, information related to a distance to a next available charging station; and
designate the next available charging station as the planned destination.

13. The system of claim 12, wherein when providing notification, to a third-party, the charge status of the electric vehicle, the system controller is further adapted to:
receive a charging status query from a third-party, wherein the third party initiates the charging status query based on at least one of:
in response to manual initiation by the third party;
automatically, based on third party navigation and destination information; and
automatically, based on battery charge level of the third party and proximity to the charging station; and
provide notification, to the third-party, the charge status of the electric vehicle in response to receiving the charging status query.

14. The system of claim 12, wherein when providing notification, to a third party, the charge status of the electric vehicle, the system controller is further adapted to provide a visual representation of the current level of charge of the electric vehicle and the time left until the charging of the electric vehicle is complete, wherein, the third party receives the visual representation of the current level of charge of the electric vehicle and the time left until the charging of the electric vehicle is complete.

15. The system of claim 14, wherein, when providing a visual representation of the current level of charge of the electric vehicle and the time left until the charging of the electric vehicle is complete, the system controller is further adapted to display, with a display of the electric vehicle, at least one of:
- the current level of charge of the electric vehicle and the time left until the charging of the electric vehicle is complete;
- a graphic representation of the current level of charge of the electric vehicle and the time left until the charging of the electric vehicle is complete; and
- a QR Code including the current level of charge of the electric vehicle and the time left until the charging of the electric vehicle is complete.

16. The system of claim 14, wherein, when providing a visual representation of the current level of charge of the electric vehicle and the time left until the charging of the electric vehicle is complete, the system controller is further adapted to display, with a display screen of the charging station, at least one of:
- the current level of charge of the electric vehicle and the time left until the charging of the electric vehicle is complete;
- a graphic representation of the current level of charge of the electric vehicle and the time left until the charging of the electric vehicle is complete; and
- a QR Code including the current level of charge of the electric vehicle and the time left until the charging of the electric vehicle is complete.

17. The system of claim 12, wherein, when providing notification, to a third party, the charge status of the electric vehicle, the system controller is further adapted to:
- upload the current level of charge of the electric vehicle and the time left until the charging of the electric vehicle is complete to a cloud-based charging station network, wherein the cloud-based charging station is adapted to allow access by the third party, and the third party receives the current level of charge of the electric vehicle and the time left until the charging of the electric vehicle is complete from the cloud-based charging station network; and
- send notification to the third party that the charging station to which the electric vehicle is connected has malfunctioned.

18. An electric vehicle equipped with a system for providing information related to a charge status of the electric vehicle when the electric vehicle is connected to a charging station, the system comprising:
- a system controller in communication with an electrical system within the electric vehicle and adapted to:
- monitor a level of charge of the electrical system within the electric vehicle;
- monitor a time left until the charging of the electric vehicle is complete by calculating at least one of a time until the electric vehicle is fully charged, and a time until the electric vehicle is charged sufficiently to allow the electric vehicle to travel from the charging station to a planned destination, wherein the system controller is further adapted to:
  - receive information related to the planned destination from at least one of input from a user of the electric vehicle, a personal device of a user of the electric vehicle, or a navigation system within the electric vehicle; or
  - when information related to the planned destination is not available, receive, from a vehicle charging station infrastructure network, information related to a distance to a next available charging station, and designate the next available charging station as the planned destination;
- receive a charging status query from a third-party, wherein the third party initiates the charging status query based on at least one of:
- in response to manual initiation by the third party;
- automatically, based on third party navigation and destination information; and
- automatically, based on battery charge level of the third party and proximity to the charging station;
- provide notification, to a third-party, the charge status of the electric vehicle in response to receiving the charging status query by at least one of:
- displaying, with a hybrid augmented reality head up display (HUD) in communication with the system controller and adapted to project information onto a window surface of the electric vehicle that is visible to both occupants within the electric vehicle and persons outside of the electric vehicle, at least one of:
- the current level of charge of the electric vehicle and the time left until the charging of the electric vehicle is complete;
- a graphic representation of the current level of charge of the electric vehicle and the time left until the charging of the electric vehicle is complete; and
- a QR Code including the current level of charge of the electric vehicle and the time left until the charging of the electric vehicle is complete;
- displaying, with a display of the electric vehicle, at least one of:
- the current level of charge of the electric vehicle and the time left until the charging of the electric vehicle is complete;
- a graphic representation of the current level of charge of the electric vehicle and the time left until the charging of the electric vehicle is complete; and
- a QR Code including the current level of charge of the electric vehicle and the time left until the charging of the electric vehicle is complete;
- displaying, with a display screen of the charging station, at least one of:
  - the current level of charge of the electric vehicle and the time left until the charging of the electric vehicle is complete;
  - a graphic representation of the current level of charge of the electric vehicle and the time left until the charging of the electric vehicle is complete; and
  - a QR Code including the current level of charge of the electric vehicle and the time left until the charging of the electric vehicle is complete; and
- uploading the current level of charge of the electric vehicle and the time left until the charging of the electric vehicle is complete to a cloud-based charging station network, wherein the cloud-based charging station is adapted to allow access by the third party, and the third party receives the current level of charge of the electric vehicle and the time left until the charging of the electric vehicle is complete from the cloud-based charging station network; and
- sending notification to the third party that the charging station to which the electric vehicle is connected has malfunctioned.

* * * * *